(12) United States Patent
Agrawal et al.

(10) Patent No.: US 9,317,873 B2
(45) Date of Patent: Apr. 19, 2016

(54) AUTOMATIC VERIFICATION OF ADVERTISER IDENTIFIER IN ADVERTISEMENTS

(71) Applicant: Google Inc., Mountain View, CA (US)

(72) Inventors: Anurag Agrawal, Palo Alto, CA (US); Varun Soundararajan, Sunnyvale, CA (US); Anshul Kothari, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/229,438

(22) Filed: Mar. 28, 2014

(65) Prior Publication Data

US 2015/0278881 A1    Oct. 1, 2015

(51) Int. Cl.
*G06Q 30/00* (2012.01)
*G06Q 30/02* (2012.01)
*G06F 17/30* (2006.01)

(52) U.S. Cl.
CPC ...... *G06Q 30/0277* (2013.01); *G06F 17/30861* (2013.01); *G06Q 30/0185* (2013.01); *G06Q 30/0248* (2013.01); *G06Q 30/0275* (2013.01)

(58) Field of Classification Search
CPC .......... G06Q 30/0245; G06Q 30/0251; G06Q 30/0255; G06Q 30/0269; G06Q 40/10
USPC ....................................................... 705/14.1
See application file for complete search history.

(56) References Cited

U.S. PATENT DOCUMENTS

| 8,166,013 | B2 | 4/2012 | Bandaru et al. |
| 8,577,016 | B1 | 11/2013 | Duva et al. |
| 2002/0129011 | A1 | 9/2002 | Julien |
| 2006/0069613 | A1 | 3/2006 | Marquardt |
| 2010/0169301 | A1 | 7/2010 | Rubanovich et al. |
| 2011/0258049 | A1 | 10/2011 | Ramer et al. |
| 2012/0265610 | A1 | 10/2012 | Shama et al. |
| 2013/0006771 | A1 | 1/2013 | Parikh |
| 2014/0180811 | A1* | 6/2014 | Boal .................. G06Q 30/0245 705/14.53 |

FOREIGN PATENT DOCUMENTS

| WO | WO-01/71449-WO | 9/2001 |
| WO | WO-2009/156988 A1 | 12/2009 |
| WO | WO-2013/142290 A1 | 9/2013 |

OTHER PUBLICATIONS

01CSpam Detection in Online Classified Advertisements,01D Tran, et al., ISBN 978-1-4503-0706-2.

(Continued)

*Primary Examiner* — Daniel Lastra

(74) *Attorney, Agent, or Firm* — Foley & Lardner LLP; John D. Lanza; James De Vellis

(57) ABSTRACT

Systems and methods for automatically verifying an identifier of a content provider are provided. A first identifier, a content item, and a uniform resource locator are received from a content provider. The domain of the uniform resource locator is determined. A plurality of second resources under the domain are accessed and stored in memory. From the plurality of second resources, a plurality of second identifiers are detected. A map of domain and a plurality of second identifiers is created. Using the map, the first identifier is compared to each of the plurality of second identifiers. If there is a match, the first identifier is approved to be used with the content item. The first identifier may be displayed on a user device with the content item.

18 Claims, 5 Drawing Sheets

(56) References Cited

OTHER PUBLICATIONS

Office Action on U.S. Appl. No. 14/246,421 dated Nov. 24, 2014, 10 pgs.
US Notice of Allowance on U.S. Appl. No. 14/246,421 DTD Dec. 1, 2015.
International Search Report & Written Opinion on PCT/US2015/019950 dated Jun. 17, 2015.
International Search Report and Written Opinion on PCT/US2015/022167, mailed May 12, 2015, 11 pgs.
US Office Action on U.S. Appl. No. 14/246,421 DTD May 21, 2015, 9 pgs.

* cited by examiner

AUTOMATIC VERIFICATION OF ADVERTISER IDENTIFIER IN ADVERTISEMENTS

BACKGROUND

In a computerized content delivery network, first-party content providers can provide information for public presentation of resources, such as web pages, documents, applications, and/or other resources. Additional third-party content can also be provided by third-party content providers for presentation on the user device together with the first-party content provided by the first-party content providers. Thus, a user viewing a resource can access the first-party content that is the subject of the resource as well as the third-party content that may or may not be related to the subject matter of the resource.

A third-party content provider may provide an identifier to be presented along with a third-party content item. A user viewing the third-party content item may also view or access the identifier. The user may be able to use the identifier to contact the third-party content provider.

SUMMARY

One implementation of the present disclosure is a computer-implemented method for verifying an identifier of a content provider. The method may be performed by a processing circuit. The method includes receiving a first identifier, a content item, and a uniform resource locator (URL) from a content provider, the URL identifying a resource. The method further includes determining a domain of the URL. The method further includes accessing a plurality of second resources, each second resource under the determined domain, to store the plurality of second resources into memory. The method further includes detecting a plurality of second identifiers from the plurality of second resources. The method further includes mapping the plurality of second identifiers with the domain. The method further includes comparing, using the map, the first identifier with each of the plurality of second identifiers, and approving use of the first identifier with the content item, responsive to the first identifier matching one of the plurality of second identifiers.

Another implementation of the present disclosure is a system for verifying an identifier of a content provider. The system includes a receiver, in communication with a network, receiving a first identifier, a content item, and a uniform resource locator (URL) from a content provider, the URL identifying a resource. The system further includes a domain determiner, in communication with the receiver, determining the domain of the URL. The system further includes a resource loader using the determined domain to store a plurality of second resources into memory, each second resource under the domain. The system further includes an extractor accessing a plurality of second identifiers from the plurality of second resources. The system further includes a mapper creating a map of the plurality of second identifiers with the domain. The system further includes a comparator using the map to compare the first identifier with each of the plurality of second identifiers. The system further includes an authorizer approving the content provider to use the first identifier with the content item, responsive to the first identifier matching one of the plurality of second identifiers.

BRIEF DESCRIPTION OF THE DRAWINGS

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

The details of one or more implementations are set forth in the accompanying drawings and the description below. Other features, aspects, and advantages of the disclosure will become apparent from the description, the drawings, and the claims, in which:

Figure 1:
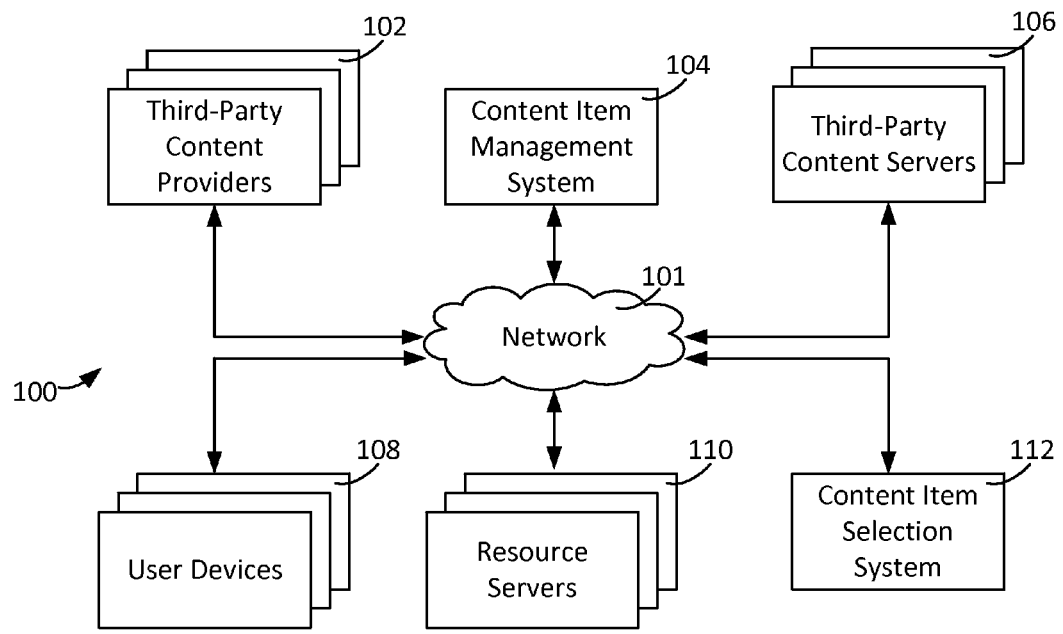
FIG. 1 is a block diagram of a computer system including a network, third-party content provider, content item management system, third-party content server, user devices, resource servers, and content item selection system, according to a described implementation.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for providing information on a computer network. The various concepts introduced above and discussed in greater detail below may be implemented in any of numerous ways, as the described concepts are not limited to any particular manner of implementation. Specific implementations and applications are provided primarily for illustrative purposes.

Referring generally to the figures, systems and methods for verifying an identifier of a content provider are shown, according to described implementations. The systems and methods described herein may be used to automatically verify an identifier that is provided by a third-party content provider, where the identifier may be provided along with a content item and a uniform resource locator (URL). The resource identified by the URL may be a landing page of the content item. In operation, a content item management system in accordance with the present disclosure receives an identifier, a content item, and a URL from a third-party content provider. The URL identifies a particular resource. A domain of the URL is determined. The content item management system uses the URL to access and store a plurality of resources that are under the same domain via a network. From the plurality of resources, a plurality of second identifiers are detected and each second identifier is compared to the first identifier. If the first identifier and one of the plurality of second identifiers match, the content item management system approves the third-party content provider to use the identifier with the URL.

A user device can view a resource, such as a web page, a document, an application, etc. The user device may request the resource that is first-party content from a first-party content provider. The user device may use an application (e.g., a web browser, a video game, a chat program, a mobile application, etc.) to request the first-party content. The first-party content can include text, audio, image, animation, video, and/or audio information. The first-party content provider can provide first-party content via a resource server for presentation on a user device over a network, e.g. the Internet. The first-party content can contain third-party content or require the user devices to request third-party content from third-party content server. User devices can receive the first-party content and request third-party content servers for third-party content item. The first-party content providers can also request third-party content servers for third-party content and transmit the received third-party content to the user devices along with the first-party content. The third-party content can be displayed along with the first-party content. The third-party content can be provided to the user devices and resource servers by third-party content servers. Third-party content providers may create or provide third-party content that is stored in third-party content server. Thus, a user viewing a resource can access the first-party content that is the subject of the resource as well as the third-party content that may or may not be related to the subject matter of the resource. The third-party content may contain links to other resources or web pages. The third-party content may also include third-party content provider identifiers which can be used by a user device to contact the third-party content providers.

For instance, a user device using a web browser can browse to a web page provided by a web page publisher. The web page publisher may be the first-party content provider and the web page may be the first-party content. The web page can be provided by a resource server. The user device loads the web page which contains an ad, which is a third-party content item. In some implementations, the resource server may receive an ad from an ad server and provide the ad with the web page to a user device. The ad server may be a third-party content server. For instance, the web page publisher may provide search engine results and the ads may be provided with the search results. In other implementations, the web page may contain a link that either directly or indirectly references an ad server. For instance, as a web browser on a user device loads the web page, the user device requests the ad and receives it from the ad server. The ad server receives the ad from an advertiser. The advertiser may be third-party content provider. The advertiser may create or provide information to generate the ad. The ad may link to a landing page which can be another web page or resource. The link can be provided by the advertiser. The ad can also contain advertiser phone number, address, social media profile page, instant messaging account ID, payment information, or other identifiers. A user device may be a smartphone, or other type of devices. Some user devices can be used to dial the advertiser phone number, locate the address, or transfer funds using the payment information.

A third-party content server may have a plurality of third-party content items that are from, for instance, different third-party content providers. In some implementations, the first-party content provider, resource server and/or the user device can communicate with plurality of third-party content servers and content item selection systems. The resource server may alternate between multiple third-party content servers or use a third-party content server for specific content item slots of a web page.

A third-party content provider, when providing third-party content items for presentation with requested resources via the Internet or other network, may utilize a content item management system to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In other instances, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system uses content item interaction data to determine the performance of the third-party content provider's content items. For instance, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management system. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. In some instances, the performance metrics may include a cost per engagement (CPE), where an engagement may be counted when a user interacts with the content item in a specified way. An engagement can be sharing a link to the content item on a social networking site, submitting an email address, taking a survey, or watching a video to completion. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used. The various performance metrics may be measured before, during, or after content item selection, content item presentation, user click, or user engagement. In some implementations, performance metrics may be measured by a click server.

In some instances, a web page or other resource (such as, for instance, an application) includes one or more content item slots in which a selected and served third-party content item may be displayed. The code, e.g., JavaScript®, Hypertext Markup Language (HTML), etc., defining a content item slot for a web page or other resource may include instructions to request a third-party content item from the content item selection system to be presented with the web page. In some implementations, the code may include an image request having a content item request URL that may include one or more parameters (e.g., /page/contentitem?devid= abc123&devnfo=A34r0). Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For instance, an auction may include bids based on whether a user clicks on the third-party content item, whether a user performs a specific action based on the presentation of the third-party content item, whether the third-party content item is selected and served, and/or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or a normalized value, may be generated to be used in the auction based on the bid value and the probability or another modifying value. In the prior instance, the value or score for a bid based on whether the third-party content item is selected and served may be $0.005*1.00=0.005 and the value or score for a bid based on whether a user performs a specific action may be $5*0.002=0.01. In some implementations, to maximize the income generated, the content item selection system may select the third-party content item with the highest value from the auction. In the foregoing instance, the content item selection system may select the content item associated with the bid based on whether the user performs the specific action due to the higher value or score associated with that bid.

Once a third-party content item is selected by the content item selection system, data to effect presentation of the third-party content item on a display of the user device may be provided to the user device using a network. The user on the user device may select or click on the provided third-party content item. In some instances, a URL associated with the third-party content item references to another resource, such as a web page or a landing page. In other instances, the URL may reference back to the content item selection system, a third-party content server, or an content item management system. One or more metrics are updated, such as a click-thru or engagement, and the user device is redirected to a resource, such as a web page or a landing page, that has been provided by a third-party content provider along with the third-party content item.

FIG. 1 is a block diagram of a computer system 100 including a network 101, third-party content providers 102, content item management system 104, third-party content servers 106, user devices 108, resource servers 110, and content item selection system 112. The system 100 use at least one computer network such as the network 101. The network 101 may include a local area network (LAN), wide area network (WAN), a telephone network, such as the Public Switched Telephone Network (PSTN), a wireless link, an intranet, the Internet, or combinations thereof.

A third-party content provider 102 may be a computing device operated by an advertiser or any other content provider. The computing device having a data processor may connect to the content item management system 104, third-party content servers 106, user devices 108, resource servers 110, and content item selection system 112 using the network 101. The third-party content provider 102 may also communicate with the content item management system 104 or user devices 108. A third-party content provider 102 may provide a content item, such as text, image, video, web page, or any other content item, to the content item management system 104. A third-party content provider 102 may also provide a URL that is associated with the content item. The URL may reference a resource, such as a web page or a landing page, that is stored at a resource server 110. A third-party content provider 102 may also provide an identifier that identifies the third-party content provider. The identifier may allow user devices 108 to contact or locate the third-party content provider 102. In providing an identifier, a third-party content provider 102 may request to the content item management system 104 that the identifier be associated with the content item and the URL. In some instances, the third-party content provider 102 may have mistakenly provided a wrong identifier. In other instances, the third-party content provider 102 may be illegitimately attempting to associate the identifier with the content item or the URL. For instance, a third-party content provider 102 may be a fraudster who provides a URL to a well-known retailer or a service provider. The fraudster may provide his own identifier, such as a phone number. Users may then call the fraudster on the provided phone number, and be tricked into providing sensitive information, such as credit card numbers, other account information, personal history, etc.

In some implementations, the third-party content provider 102 may connect with the content item management system 104 to manage the selection and serving of content items by content item selection system 112. For instance, the third-party content provider 102 may set bid values and/or selection criteria via a user interface that may include one or more content item conditions or constraints regarding the serving of content items. A third-party content provider 102 may specify that a content item and/or a set of content items should be selected and served for user devices 108 having device identifiers associated with a certain geographic location or region, a certain language, a certain operating system, a certain web browser, etc. In another implementation, the third-party content provider 102 may specify that a content item or set of content items should be selected and served when the resource, such as a web page, document, etc., contains content item that matches or is related to certain keywords, phrases, etc. The third-party content provider 102 may set a single bid value for several content items, set bid values for subsets of content items, and/or set bid values for each content item. The third-party content provider 102 may also set the types of bid values, such as bids based on whether a user clicks on the third-party content item, whether a user performs a specific action based on the presentation of the third-party content item, whether the third-party content item is selected and served, and/or other types of bids.

A content item management system 104 can be a data processing system. The content item management system 104 can include at least one logic device, such as a computing device having a data processor, to communicate via the network 101, for instance with third-party content providers 102, third-party content servers 106, user devices 108, resource servers 110, and content item selection system 112. The one or more processors may be configured to execute instructions stored in a memory device to perform one or more operations described herein. In other words, the one or more data processors and the memory device of the content item management system 104 may form a processing module. The content item management system 104 may be combined with third-party content servers 106, content item selection system 112, or a resource server 110 in to one or more computing device. For instance, a content item selection module may be part of a content item management system 104. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, Extensible Markup Language (XML), Python®, and Visual Basic®. The processor may process instructions and output data to effect verification of an identifier that is provided by a third-party content provider 102. The processor may also process instructions to receive data via the network 101 and to provide data from the content item management system 112 to the third-party content providers 102. In addition to the processing circuit, the content item management system 110 may include one or more databases configured to store data. A data storage device may be connected to the content item management system 104 through the network 101. The content item management system is described in greater detail in relation to FIG. 3.

The third-party content servers 106 can include a computing device, such as a server, configured to store third-party content items. The third-party content server 106 may directly or indirectly provide third-party content items to the content item management system 104, user devices 108, resource servers 110, content item selection system 112, and/or to other computing devices via network 101. The third-party content servers 106 may be a computer server (e.g., a file transfer protocol (FTP) server, file sharing server, web server, etc.), a combination of servers (e.g., a data center, a cloud computing platform, etc.). In some implementations, the third-party content servers 106 may be any type of memory device capable of storing third-party content provider data, user profile data, content item data, accounting data, auction data or any other type of data used by content item management system 104, the content item selection system 112, or another component of computer system 100. The third-party content servers 106 may include any type of non-volatile memory, media, or memory devices. For instance, third-party content servers 106 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, third-party content servers 106 are local to content item management system 104, content item selection system 112, or resource server 110. In other implementations, third-party content servers 106 are remote data storage devices connected with content item management system 104 and/or content item selection system 112 via network 101. In some implementations, third-party content servers 106 are part of a data storage server or system capable of receiving and responding to queries from content item management system 104 and/or content item selection system 112. In some instances, the third-party content servers 106 may be integrated into the content item management system 104 or the content item selection system 112. In some instances, third-party content items may be stored in a database of the content item management system 104 or the content item selection system 112. In some implementations, the third-party content providers 102 or the content item management system 104 may store new content items or delete old content items in the third-party content servers 106. In some implementations, the user devices 108, resource servers 110, and content item selection system 112 may request content items stored in the third-party content servers 106.

The content items that are stored in the third-party content servers 106 may be in any format that may be presented on a display of a user device 108, for instance, graphical, text, image, audio, video, etc. The content items may also be a combination or hybrid of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc.

User devices 108 may include any number and/or type of user-operable electronic devices. For instance, user devices 108 may include a desktop computer, laptop, smart phone, wearable device, smart watch, tablet, personal digital assistant, set-top box for a television set, smart television, gaming console device, mobile communication devices, remote workstations, client terminals, entertainment consoles, or any other devices configured to communicate with other devices via the network 101. User devices 108 may be capable of receiving resource from resource servers 110 and/or third-party content items from content item selection system 112, third-party content servers 106, and/or resource servers 110. The user device 108 may be any form of electronic device that includes a data processor and a memory. The memory may store machine instructions that, when executed by a processor, cause the processor to request a resource, load the resource, and request a content item. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The user device 108 can execute a software application (e.g., a web browser or other application) to retrieve resources and contents from other computing devices over network 101. Such an application may be configured to retrieve resources and first-party content from a resource server 110. In some cases, an application running on the user device 108 may itself be first-party content (e.g., a game, a media player, etc.). User devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). User devices 108 may function as a user agent for allowing a user to view HTML encoded content. In some implementations, user devices 108 include an application (e.g., a web browser, a resource renderer, etc.) for converting electronic content into a user-comprehensible format (e.g., visual, aural, graphical, etc.). For instance, the user device 108 may execute a web browser application which provides a browser window on a display of the user device. The web browser application that provides the browser window may operate by receiving input of a uniform resource locator (URL), such as a web address, from an input device (e.g., a pointing device, a keyboard, a touch screen, or another form of input device) or from a memory element. In response, one or more processors of the user device 108 executing the instructions from the web browser application may request data from another device connected to the network 101 referred to by the URL address (e.g., a resource server 110). The computing device receiving the request may then provide web page data and/or other data to the user device 108, which causes visual indicia to be displayed by the display of the user device 108. Accordingly, the browser window displays the retrieved first-party content, such as web pages from various websites, to facilitate user interaction with the first-party content. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content item slot within which a third-party content item is presented.

In some implementations, user devices 108 are capable of detecting an interaction with a distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item) by content item selection system 112 or by content item management system 104.

User devices 108 may generate a variety of user actions. For instance, user devices 108 may generate a user action in response to a detected interaction with a content item. The user action may include a plurality of attributes including a content identifier (e.g., a content ID or signature element), a device identifier, a referring URL identifier, a timestamp, or any other attributes describing the interaction. User devices 108 may generate user actions when particular actions are performed by a user device (e.g., resource views, online purchases, search queries submitted, etc.). The user actions generated by user devices 108 may be communicated to a click server, a content item management system 104 or a separate accounting system.

In some implementations, the system 100 may further comprise a click server. In some implementations, the click server may be part of the content item selection system 112, the content item management system 104, or another server connected to the network 101. In some implementations, the click server may be a separate server connected to the network 101. The click server receives a request from a user device 108 when the user interacts with the content item that the user device 108 receives from the content item selection system 112. For instance, a user may engage with a content item by selecting a first identifier that is provided along with the content item. The click server may receive the request and update a performance metric stored in the content item management system 104 or the third-party content server 106. For instance, the metric may be a user engagement with an advertisement. The performance metric may be stored in association with the provided third-party content item in the third-party content server 106. The click server may redirect the user device 108 to a resource that is stored in a resource server 110, wherein the resource may be the landing page that is identified by the URL provided by the third-party content provider 102.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content item from the content server that may be more relevant to the user. In addition, certain data may be treated (e.g., by content item selection system 112) in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content item selection system 112.

The resource servers 110 can include a plurality of computing devices. A computing device may be a server, configured to host a resource, such as a web page or other resource (e.g., articles, comment threads, music, video, graphics, search results, information feeds, etc.). The resource server 110 may be a computer server (e.g., a file transfer protocol (FTP) server, file sharing server, web server, etc.) or a combination of servers (e.g., a data center, a cloud computing platform, etc.). One resource server 110 can provide resource data or other content, e.g., text documents, portable document format (PDF) files, and other forms of electronic documents, to the user device 108, and another resource server 110 can provide the resource referenced by a URL provided by a third-party content provider along with a content item. For instance, one resource server can host a publisher web page or a search engine, and another resource server can host a resource such as a landing page referenced by an advertiser; in some instances, one resource servers 110 may host both resources. In one implementation, the user device 108 can access the resource server 110 via the network 101 to request data to effect presentation of a resource of the resource server 110. In one implementation, the content item management system 104 can access another resource server 110 via the network 101 to request the resource referenced by the URL provided by a third-party content provider 102.

Resources provided by the resource server 110 may include any type of information or data structure that can be provided over network 101. In some implementations, resources may be identified by a resource address associated with the resource server 110 (e.g., a URL). Resources may include web pages (e.g., HTML web pages, PHP: Hypertext Preprocessor (PHP) web pages, etc.), word processing documents, PDF files, images, video, programming elements, interactive content, streaming video/audio sources, or other types of electronic information. Resources provided by the resource server 110 may be web pages, local resources, intranet resources, Internet resources, or other network resources. In some implementations, resources include one or more web pages to which user devices 108 are directed (e.g., via an embedded hyperlink) when user devices 108 interact with a third-party content item provided by a content item selection system 112.

The content item selection system 112 can include at least one logic device, such as a computing device having a data processor, to communicate via the network 101, for instance with a third-party content provider 102, content item management system 104, third-party content server 106, user devices 108, and/or resource servers 110. In some implementations, the content item selection system 112 may include third-party content servers 106. The content item selection system 112 can include a server, such as an advertisement server or otherwise.

In one implementation, a content item selection system 112 can receive, via the network 101, a request for a content item to present with a resource. The received request may be received from a resource server 110, a user device 108, and/or any other computing device in the system 100. The resource server 110 may be owned or operated by a first-party content provider. The resource server 110 or the resource may include instructions for one or more content item selection systems 112 to provide third-party content items with one or more resources of the first-party content provider on the resource server 110. In one implementation, the resource may include a web page. The user device 108 may be a computing device operated by a user (represented by a device identifier), which, when accessing a resource of the resource server 110, can make a request to a content item selection system 112 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords associated with the requested resource, text of the content of the resource, a title of the resource, a category of the resource, a type of the resource, etc.). The information that the content item selection system 112 receives can include a HyperText Transfer Protocol (HTTP) cookie which contains a device identifier (e.g., a random number) that represents the user device 108. In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 112 to select third-party content items to be served with the requested resource and presented on a display of a user device 108.

Figure 2:
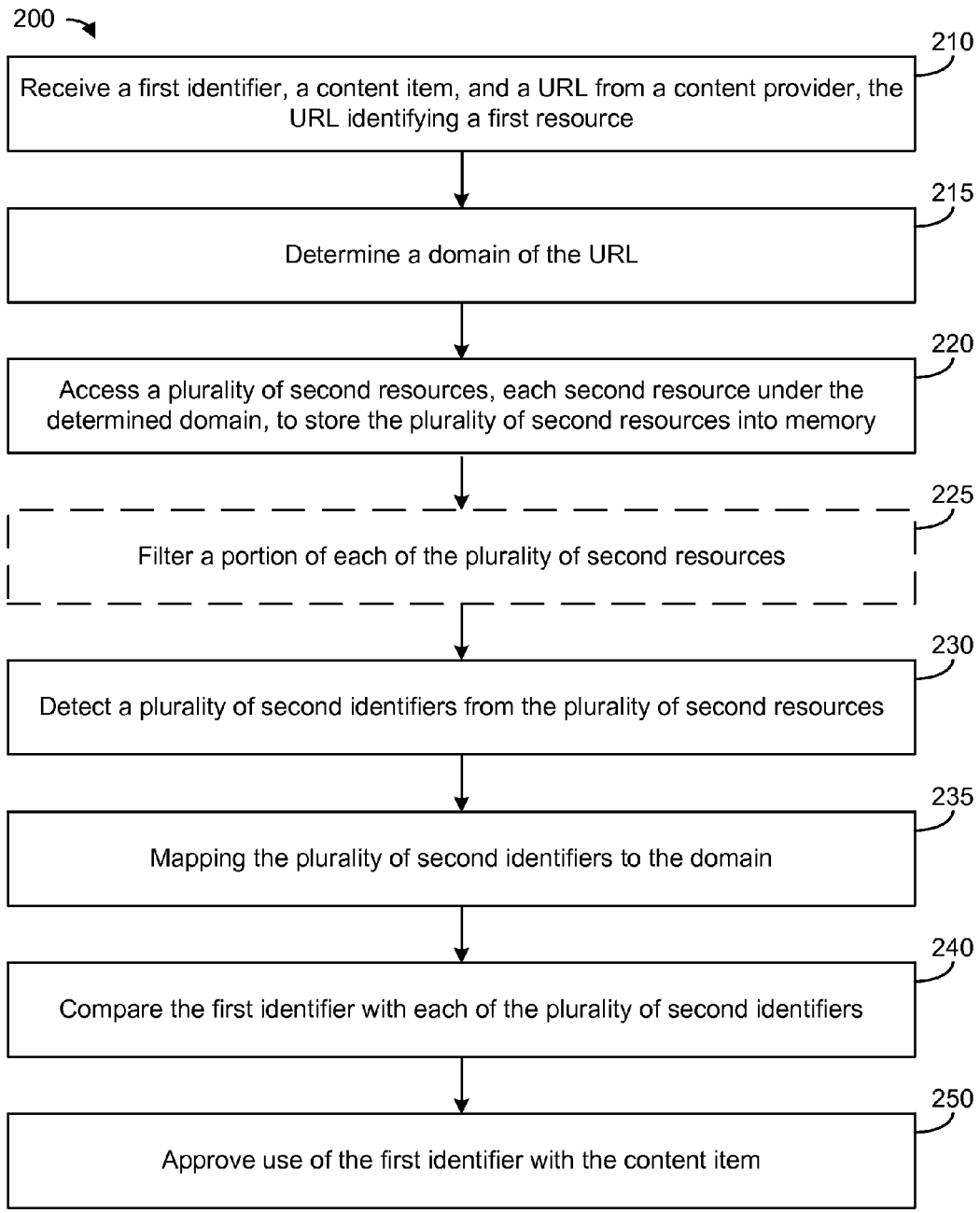
FIG. 2 is a flowchart of one implementation of a process for verifying an identifier of a content provider.

FIG. 2 is a flowchart of one implementation of a process for verifying an identifier of a content provider. In brief overview, the method generally includes receiving a first identifier, a content item, and a URL from a content provider, the URL identifying a first resource (210), determining a domain of the URL (215), accessing a plurality of second resources, each second resource under the determined domain, to store the plurality of second resources into memory (220), and detecting a plurality of second identifiers from the plurality of second resources (230). The method also includes mapping the plurality of second identifiers with the domain (235), comparing the first identifier with each of the plurality of second identifiers (240), and approving the content provider to use the first identifier with the content item (250). The method may optionally include filtering a portion of the each of the plurality of second resources (225). In other implementations, these stages can be performed in a different order.

Specifically, the method includes receiving a first identifier, a content item, and a URL from a content provider, the URL identifying a first resource (210). In some implementations, the content item is associated with the URL. For instance, the first resource identified by the URL is the landing page of the content item. The first identifier, the content item, and the URL may be sent from a third-party content provider 102 and received at the content item management system 104. In some implementations, only the URL and the first identifier are received, and the content item is generated from the first resource identified by the received URL. For instance, the first resource referenced by the URL may be accessed and stored, and various elements from the first resource may be combined to generate the content item. In some implementations, only the content item and the first identifier are received and the content item contains the URL. In some implementations, only the content item and the URL are received and the content item contains the first identifier. In some implementations, only the content item is received, and the content item contains the first identifier and the URL. For instance, the content item may be an image, and part of the image may contain the first identifier. The first identifier may be extracted from the image using, for example, optical character recognition. In another instance, the content item may be a text, and part of the text may contain the first identifier. The first identifier may be extracted from the text using, for example, pattern recognition or regular expressions. In implementations where the first identifier is extracted from the content item, the method may include verifying that the first identifier is valid by using the first identifier to contact the content provider. For instance, if the content item is an advertisement that displays an embedded phone number, the method may include verifying that clicking on the advertisement calls the content provider by dialing the phone number. In implementations where the content item is received with the first identifier, the content item is verified as not embedding another identifier. For instance, the content item is scanned to verify whether the content item embeds another identifier. In some instances, if the content item embeds an identifier, the content provider is not allowed to use the content item. In other instances, if the content item embeds an identifier, that identifier is detected, and the first identifier is not approved for use with the content item if the extracted identifier does not match the first identifier. Otherwise, if the extracted identifier matches the first identifier, the method 200 continues.

An identifier may be any contact information of the third-party content provider 102 that can be associated with the content item. A user on a user device 108 can use an identifier to contact or locate the third-party content provider 102. An identifier may be a phone number, mailing address, email address, fax number, video chat handle, instant messaging handle, social media profile, payment information, or any other contact information. The third-party content provider 102 provides contact information as the first identifier that can be displayed along with the content item or embedded within the content item when the content item is displayed to user devices 108, such that the users on the user devices 108 can contact the third party content provider 102 using the first identifier. For instance, the third-party content provider 102 may provide a sales phone number with an advertisement that is displayed to users on user devices 108, so that users can call the third-party content provider 102 on the sales phone number.

The URL references a resource that is hosted on a resource server 110 or the third-party content provider 102. The received URL may identify a resource that is a web page or a landing page for the received content item. The first resource may be maintained by the third-party content provider 102. The content item may be an advertisement of a product, a service, a promotion, a coupon, etc. that is offered on the first resource by the third-party content provider 102. For instance, the third-party content provider 102 may be an online retailer, the first resource may be a web page of the online retailer, and the content item may be an advertisement for the web page.

As shown in FIG. 2, the method further includes determining a domain of the URL (215). A domain of the URL can be identified by parsing the URL as a text string. In some implementations, the URL may be parsed to identify the domain of the URL. Regular expressions, text searching, pattern recognition, and other means known in the art may be used to identify a domain of the URL.

In some implementations, the domain is a root domain. In other implementations, the domain is a subdomain. For instance, the URL may be sub.example.com, in which "example" is the root domain and "sub" is the subdomain. Some URLs may have multiple levels of subdomains. In some implementations, a plurality of domains may be determined, each domain of a different domain level. For instance, a root domain and a subdomain of the URL may be determined. In some implementations, one of the domains is selected based on the number of resources available in each domain. In some implementations, one of the domains is selected based on the type of the domain.

In some implementations, one of the domains of the URL is selected based on comparing the domains to a list of domains. The list of domains may be stored in the content item management system 104, content item selection system 112, resource server 110, or any other component in the computer system 100. Each level of the domain in the URL may be compared against the list of domains. In some implementations, the root domain may be compared first and the sub domains may be compared in the order of domain level. In some implementations, the lowest level domain may be compared first, and higher level domains may be compared in reverse order of domain level. The list of domains may store domains that may comprise subdomains that are controlled by multiple organizations or users. For instance, the list may include example.com, where example.com may have subdomains parent1.example.com and parent2.example.com, each subdomain controlled or owned by a different organization or user. The method may include selecting a domain from one of the root domain or one or more subdomain such that the selected domain does not appear in the list of domains. For instance, the received URL may be parent1.example.com. The root domain, example.com, may be compared against the list of domains first. The root domain is found in the domain and so it is not selected. The subdomain, parent1.example.com, is compared against the list of domains. The subdomain may not be found in the list of domains, and so the subdomain is selected.

In some implementations, one of the domains is selected based on looking up the organization or user controlling the one or more domains in the URL. A domain that is of the highest level controlled by only one organization or user may be selected. The organization or user of each domain may be stored in content item management system 104, content item selection system 112, resource server 110, or any other component in the computer system 100. For instance, the organization controlling the root domain example.com may be determined to be Example Inc., and the organization controlling the subdomain parent1.example.com may be determined to be Parent1 Inc. Another subdomain under the root domain may be found that is controlled by a different organization, such as parent2.example.com. In response, the subdomain parent1.example.com may be selected over the root domain example.com.

In some implementations, the method may include selecting the lowest level domain. If no identifiers are extracted from the stored resources, or if no identifiers are matched from the extracted plurality of identifiers, then a higher level domain may be selected. This process can repeat until the root domain is reached.

In some implementations, a map of a domain with a plurality of second identifiers is loaded from a database or memory element. The map may include a freshness value that indicates when the map was created or updated. The freshness value can be compared against a predetermined value or threshold to determine whether the map must be updated or recreated. In some implementations, the loaded map may be used instead of accessing and storing a plurality of second resources (220), detecting a plurality of second identifiers (230), and mapping the plurality of second identifiers to the domain (235).

As shown in FIG. 2, the method further includes accessing a plurality of second resources, each second resource under the determined domain, to store the plurality of second resources into memory (220). In some implementations, the plurality of second resources may be loaded into memory. A second resource may be identified by a second URL that shares the same domain as the received URL. In some implementations, a database or a memory element of a computing device connected to the network 101 stores a plurality of second URLs that is under the same domain as the received URL. The database or a memory element may be part of a search engine, the content item management system 104, a third-party content server 106, or a content item selection system 112. The database or a memory element may be queried to retrieve the plurality of URLs. For instance, the database may store a map of a plurality of URLs with each domain. A web crawler or a bot may load the resources or web pages identified by the plurality of URLs received from the database query. In some implementations, a web crawler or a bot may crawl or navigate to the domain of the URL and identify each resource or web page under that domain.

Each second resource under the domain may be accessed and stored in memory. A second resource may be accessed from a resource server 110 that stores the first resource or in a different resource server 110 whose Internet Protocol address resolves to the same domain. The first resource may be accessed and stored as one of the second resources. In some instances, the plurality of second resources may only comprise the first resource. The content item management system 104 may access or request a second resource from a resource server 110 hosting the second resource. The resource server 110 may in response send a second resource to the content item management system 104. In some implementations, a second resource is stored as a text string into memory, for instance as a HTML file. In other implementations, a second resource may be parsed into object trees and rendered, for instance as a web page. In some implementations, a second resource may contain references to other content items, such as images, that are rendered on the web page. In some implementations, the other content items referenced by the second resources are not accessed, stored, loaded or rendered. For instance, the other content items may be advertisements, which are not accessed, stored, loaded or rendered with the web page.

For instance, accessing and storing a resource may include loading the resource by parsing the resource into an object tree, such as a document object model (DOM) tree. The DOM tree may be a hierarchical model of a particular resource. The DOM tree may include image information (e.g., image URLs, display positions, display sizes, alt text, etc.), font information (e.g., font names, sizes, effects, etc.), color information (e.g., RGB color values, hexadecimal color codes, etc.) and text information for the resource.

In another instance, accessing and storing a resource may include loading the resource by rendering the resource to create a snapshot image of the rendered resource. The snapshot image may be a visual representation of a particular resource. The snapshot image may illustrate the visual appearance of the resource as presented on a user interface device (e.g., an electronic display screen, a computer monitor, a touch-sensitive display, etc.) after rendering the resource. The snapshot image may include color information (e.g., pixel color, brightness, saturation, etc.). In some implementations, the snapshot image may be a picture file having any viable file extension (e.g. .jpg, .png, .bmp, etc.).

As shown in FIG. 2, the method optionally includes filtering a portion of each of the plurality of second resources (225). In some implementations, an entire second resource may be filtered. In some implementations, for one of a plurality of second resources, no portion is filtered. In some implementations, an identified portion of a resource may be filtered by deleting a portion of a resource that is stored in memory. For instance, if the text of the second resource is stored in memory, portions of the text of the second resource are deleted in memory. In another instance, if the second resource is parsed into an object tree, nodes corresponding to the filtered portions are deleted in memory. In some instances, the locations of the filtered portions of the second resource are stored in a list or in another data structure. In some implementations, the filtered portion may correspond to a third-party content item or advertisement. The third-party content item may be detected by finding a tag or a node that indicates a corresponding portion of the first resource as a third-party content item.

The filtered portion may be user content, i.e. content that is authored by a visitor or a user of a web page rather than the publisher or host of the web page. For instance, some web pages may have comments sections where any user may write his own comments. In some implementations, user comments may be detected by searching through a stored or loaded second resource. In some implementations, a tag or a node of the stored or loaded second resource may indicate that a corresponding portion of the second resource is a comment. In some implementations, a comment may be detected by finding a time or date signature with a username, located in proximity to a portion of the second resource which is identified as a comment. The proximity may be determined by analyzing the stored or loaded second resource, such as by parsing a Cascading Style Sheets (CSS) or rendering the resource as a web page. In some implementations, a comment or a comment section may be detected finding a third-party commenting system embedded in the second resource. In some implementations, a username or a signature associated with the username may be detected to reoccur in the plurality of second resources. Content proximate to the username or the signature may be filtered.

As shown in FIG. 2, the method further includes detecting a plurality of second identifiers from the plurality of second resources (230). In some implementations, the method may include extracting, determining, or identifying the plurality of second identifiers from the plurality of second resources. In some implementations, the plurality of second identifiers may only comprise one second identifier. In accessing the second identifier, the filtered portions of the second resources are ignored. For instance, a potential identifier may be in a comment section of a web page, in which case the potential identifier is not accessed as a second identifier. In implementations where the locations of the filtered portions are stored in a list, any potential identifier that is found on a second resource is checked against the list. If a potential identifier is located in a position specified in the list, the potential identifier is not selected as a second identifier. In some implementations, a second identifier may be accessed from a hidden portion of a second resource. A hidden portion of a resource may be specified by a tag or a node of the second resource. In implementations where the plurality of second resources are stored or loaded as text into memory, regular expressions, pattern recognition, and other text search can be used to find the second identifier or the plurality of second identifiers. In implementations where a second resource may be parsed into an object tree and rendered, a second identifier may be detected in the rendered second resource via, for instance, optical character recognition.

A second identifier may be any contact information of the third-party content provider 102 that can be detected from the plurality of second resources. A second identifier may be a phone number, a mailing address, email address, fax number, video chat handle, instant messaging handle, social media profile, payment information, or any other contact information, that is the same type of contact information as the first identifier. In some implementations each of the plurality of second identifiers may be of the same type of identifier as the first identifier. For instance, if the first identifier is a phone number, each of the plurality of second identifiers is also a phone number. A plurality of potential identifiers in a second resource may be found. Each of the potential identifiers may be classified. For instance, one potential identifier may be classified as a phone number, and another potential identifier may be classified as an email address. Only the potential identifiers that are classified as the same type of identifier as the first identifier may be selected as one of a plurality of second identifiers. In other implementations, some of the second identifiers may be of a different type of identifier as the first identifier. For instance, the first identifier may be a phone number, one of the second identifiers may be a phone number, and another of the second identifiers may be an email. Different sets of rules may be used to detect the second identifier depending on the type of identifier. For instance, one set of rules may be used to detect a phone number, and another set of rules may be used to detect a mailing address. In some implementations, a plurality of contact information may be detected in one portion of the web page. For instance, an address may be proximate to a phone number in the resource.

The set of rules for detecting different types of identifiers may be implemented as modules. A set of rules may be used in detecting a phone number, mailing address, an email, a fax number, a video chat handle, an instant messaging handle, payment information, or a social media profile. For instance, detecting a video chat handle may comprise searching a second resource for an embedded Uniform Resource Identifier (URI).

The set of rules to detect a phone number is described in further detail. In some implementations, various conventions and formats may be taken into account when detecting a second identifier. A phone number convention may specify whether or not a potential identifier is a valid phone number. A phone number format may specify various common ways in which a phone number is written. For instance, in the United States and other North American Numbering Plan countries, a telephone number may comprise ten digits, where the first three digits are an area code. The area code may be placed inside brackets or the area code may be separated from the other four numbers with a dash or a period. A prefix number, 1, may be included with the ten digits. For instance, the first resource may contain a number comprising ten digits where the first three digits are separated by a dash. The number may then be detected as a second identifier. In some implementations, the conventions and formats for multiple countries and regions may be applied. For instance, a phone number in India is also ten digits. In detecting the second phone number from the first resource or the plurality of second resources, if a potential phone number has ten digits, then it is compared against the set of rules for U.S. phone numbers as well as the set of rules for India phone numbers.

In some implementations, a country code top-level domain of the URL may be detected from the URL to determine which set of rules to use to detect a second identifier. For instance, if the country code top-level domain of the URL is ".us" then a phone number adhering to the set of rules for U.S. phone number may be detected as a second identifier. In some implementations, the domain name may be resolved to an Internet Protocol (IP) address, which can then be used to find the geo-location of the resource servers 110. In some implementations, the location of the user device 108 may be determined. A geo-location can be used to determine which set of rules to use to detect a second identifier. For instance, if a geo-location indicates that the resource server 110 or the user device 108 is located in northern California, a set of rules for detecting phone numbers in U.S. may be used. In another instance, a set of rule detecting phone numbers in the U.S. with area codes corresponding to the northern California may be used.

The set of rules to detect a mailing address is described in further detail. A mailing address may comprise one or more of country, postal code, county, state, city, town, village, city area, district, street, street number, unit number, company name, or any other parts of a mailing address. A mailing address convention may specify the order of different parts of the mailing address as well as acronyms, abbreviations, prefixes, and suffixes. One or more parts of an address may be found by searching the text of the second resource using regular expressions, pattern recognition, and other text search. For instance, a regular expression search may find a five-digit or a nine-digit zip code for an address in the United States. Other parts of the address may be detected close to the found part of the mailing address. For instance, a state abbreviation, such as CA for California, may be found to precede the found zip code. In some implementations, the object tree of the second resource may be used to find the mailing address. A tag or a node of the object tree may indicate an embedded map. For instance, an iframe tag with a src attribute set to a link to a map web site may indicate that a map is embedded in a second resource. A mailing address may be detected within the tag or node, or proximate to the tag or node.

As shown in FIG. 2, the method includes creating a map of the second identifier with the domain (235). In some implementations, the map may include a plurality of second identifiers that is mapped to a domain. In some implementations, the map may comprise a plurality of second identifiers that is mapped to a URL. In some implementations, the map contains no duplicate second identifiers. The map may also include freshness value. The freshness value may specify when the map of the domain was updated or created. The map can be stored in a database or a memory element. In some implementations, the stored map can be loaded after determining the domain of the URL (215).

As shown in FIG. 2, the method further includes comparing the first identifier with each of the plurality of second identifiers (240). In some implementations, the first identifiers is compared against each of the plurality of second identifiers that are of the same type of identifier as the first identifier. For instance, each of the second identifiers that are phone numbers are compared against the first identifier that is a phone number. In some implementations, a partial match may be accepted. For instance, a portion of the first identifier is compared against a portion of each of the second identifiers. If there is a match in the portion of a first identifier with a portion of a second identifier, and if the portion is a predetermined size and field of the identifier, where the predetermined size and field is determined by the type of identifier, then the match is accepted and the method continues. For instance, if the first identifier is a phone number, at least first predetermined size of eight digits must match for the match to be accepted. In another instance, if the first identifier is a mailing address, all fields must match except the predetermined field of apartment unit number for the match to be accepted.

As shown in FIG. 2, the method further includes approving use of the first identifier with the content item, responsive to the first identifier matching one of the plurality of second identifiers (250). In some implementations, the first identifier may match with one of the second identifiers. In other implementations, the first identifier may match with more than one of the plurality of second identifiers if, for instance, the map contained duplicate entries. The content provider may be informed that the first identifier was verified with the provided content item and URL. In some implementations, the first identifier is associated with the received content item. For instance, the first identifier is embedded in the content item. The first identifier may be stored with the content item in the third-party content server 106. When the content item selection system 112 determines during an auction that a content item stored on the third-party content server 106 should be served to the user device 108, the content item is served together with the first identifier. The identifier may be displayed with the content item at the user device 108 or the first identifier may also be embedded in the content item such that a user on a user device 108 can contact the content provider by clicking or interacting with the content item. For instance, a user device 108 may be a smartphone, a content item may be an advertisement, and a first identifier may be a phone number for the advertiser. When the user on the smartphone clicks on the advertisement, the smartphone may dial the phone number.

In some implementations, the content item selection system 112 may generate a link to a click server and transmits the link with the content item to a user device 108. On the user device 108, the link to a click server can be displayed as a way to contact the third-party content provider. For instance, the link may be displayed as a way to call a phone number to an advertiser. When a user clicks on the link, the user device may send a request to the click server. The click server may log a metric, such as engagement, with the content item and store the metric in the content item management system 104. The click server may then send an instruction back to the user device 108 to contact the third-party content provider 102 via the first identifier associated with the content item. For instance, the click server may send instructions to the user device 108 to dial the phone number provided with the advertisement. In another instance, the click server may send an instruction back to the user device 108 to open a new email message or send a SMS text message or use any other application to contact or locate the third-party content provider 102 via the first identifier.

The first identifier may not be approved for use with the content item responsive to the first identifier not matching any of the plurality of second identifiers. The method 200 may then include informing the content provider that the received first identifier could not be verified. In some implementations, the content provider may be instructed to edit one of the plurality of second resources to include the first identifier. For instance, a content provider may wish to use a new phone number that is not listed on their web site. The content provider may then modify one or more of the second resources to include the first identifier. The modified resource can then be loaded. The modified resource can be one of the second resources or a new resource that is under the same domain as the received URL. The second resource may be modified such that the first identifier is in some portion of the resource. The first identifier may be in a hidden portion of the resource. The modified resource is loaded, and a third identifier is detected from the modified resource. The third identifier is compared against the first identifier, and if there is a match, then first identifier is approved for use with the content item. In some implementations, the content provider may indicate that they are unable or unwilling to modify a second resource or create a new second resource that contains the first identifier. If the content provider is known to be legitimate, the first identifier may be verified offline, by the content provider manually providing a support personnel with the first identifier. For instance, a content provider may be an advertiser, who has a contractual agreement with an online retailer. The URL may identify a resource that redirects the user device 108 to the web site of the online retailer, but the identifier may be a phone number of the online retailer. The advertiser may not be able to modify the resource that redirects the user device 108. If the advertiser is known to be a legitimate advertiser, they may call a support personnel of the content item management system 104 and provide the first identifier.

Figure 3:
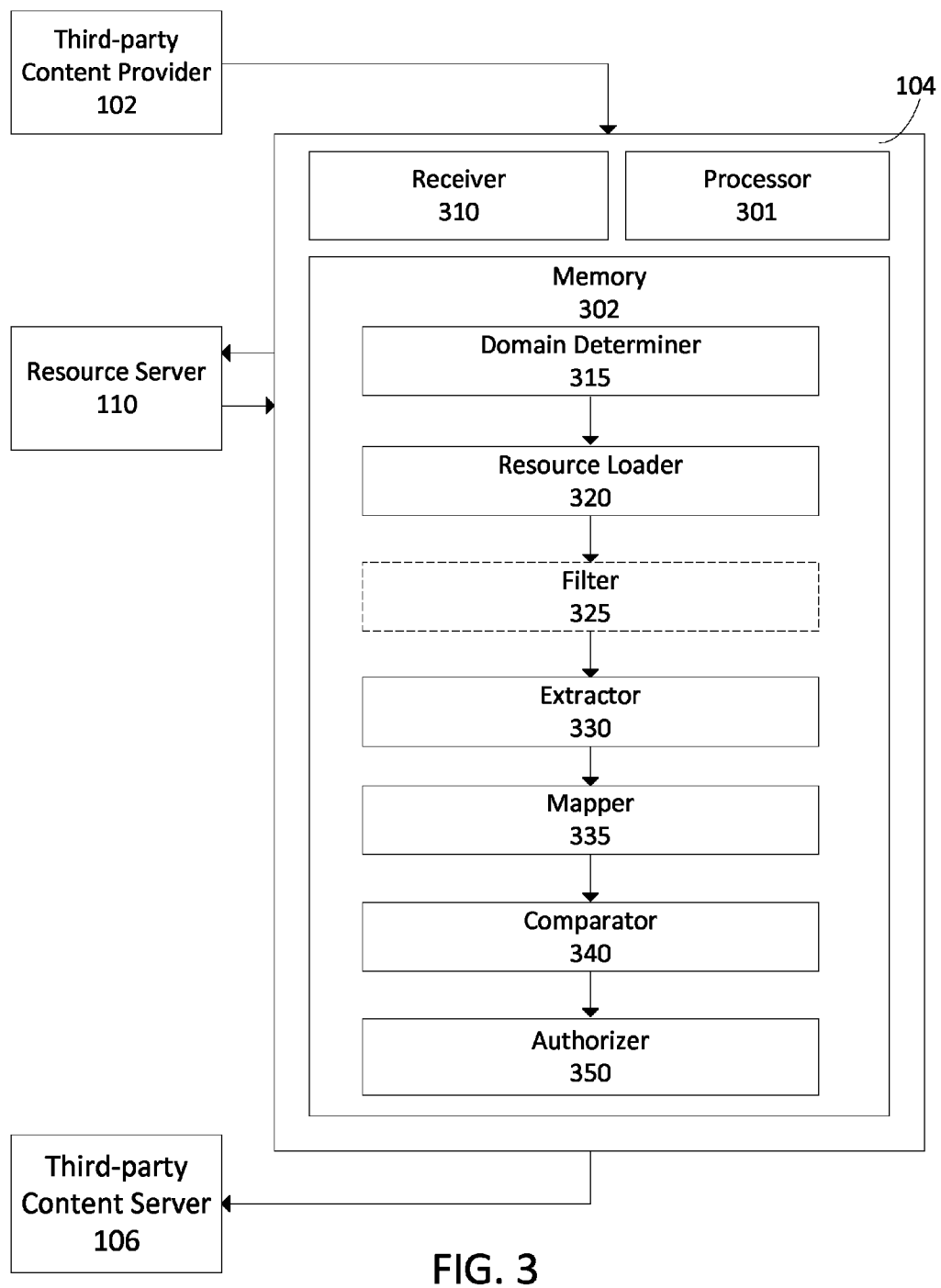
FIG. 3 is a block diagram illustrating one implementation of the content item management system of FIG. 1 in greater detail, showing a receiver, a processor, and a memory.

FIG. 3 is a block diagram illustrating one implementations of the content item management system 104 of FIG. 1 in greater detail, shown to include a receiver 310, a processor 301, and memory 302. The receiver 310 may be a communication interface that includes wired or wireless interfaces (e.g., jacks, antennas, transmitters, receivers, transceivers, wire terminals, Ethernet ports, WiFi transceivers, etc.) for conducting data communications with local or remote devices or systems via the network 101. For instance, the receiver 310 may allow content item management system 104 to communicate with third-party content provider 102, third-party content server 106, resource server 110, and other components of computer system 100. In some implementations, the receiver may have a corresponding module or software that works in conjunction with hardware components. The receiver 310 may receive from a third-party content provider 102, a first identifier, a content item, and a URL. The receiver 310 may transmit the received identifier, content item, and URL to a module in memory such as to the domain determiner 315.

The processor 301 may be implemented as a general purpose processor, an application specific integrated circuit (ASIC), one or more field programmable gate arrays (FPGAs), a CPU, a GPU, a group of processing components, or other suitable electronic processing components. The processor 301 may be in communication with the receiver 310 and the memory 302. Further, the processor 301 may execute instructions stored in memory 302.

Memory 302 may include one or more devices (e.g., RAM, ROM, flash memory, hard disk storage, etc.) for storing data and/or computer code for completing and/or facilitating the various processes, layers, and modules described in the present disclosure. Memory 302 may include volatile memory or non-volatile memory. Memory 302 may include database components, object code components, script components, or any other type of information structure for supporting the various activities and information structures described in the present disclosure. The memory 302 may be in communication with the receiver 310. In some implementations, memory 302 is communicably connected to processor 301 and includes computer code (e.g., data modules stored in memory 302) for executing one or more processes described herein. In brief overview, memory 302 is shown to include a domain determiner 315, a resource loader 320, an optional filter 325, an extractor 330, a mapper 335, a comparator 340, and an authorizer 350.

Still referring to FIG. 3, memory 302 is shown to include a domain determiner 315. The domain determiner 302 may be in communication with the receiver 310. The domain determiner 315 determines a domain of the received URL. The domain may be a root domain or a subdomain. The domain determiner 315 may parse the URL as a text string. In some implementations, after the domain determiner 315 determines the domain, a map of a domain with a plurality of second identifiers is loaded. A database may be queried to receive a map of a domain with a plurality of second identifiers.

Still referring to FIG. 3, memory 302 is shown to include a resource loader 320. The resource loader 320 may communicate with the receiver 310 to access a plurality of second resources, each second resource under the determined domain and store the plurality of second resources into memory 302. In some implementations, the resource loader 320 may load the plurality of second resources into memory 302. In some implementations, a database or the memory of a computing device, such as a resource server 110, connected to the network 101 stores a plurality of second URLs that is under the same domain as the received URL. In some implementations, the resource loader 320 uses a web crawler or a bot to access, crawl or navigate to the domain of the URL to identify, store or load each resource under the determined domain. Each second resource may be accessed and stored into memory 302. In some implementations, resource loader 320 accesses and stores the first resource into memory 302 as one of the second resources. In some implementations, resource loader 320 accesses and stores a second resource as a text string into memory. In other implementations, resource loader 320 may comprise a parser and a renderer. The parser may parse a second resource into an object tree and the renderer may render a second resource using the object tree.

Still referring to FIG. 3, memory 302 is shown to optionally include a filter 325. The filter 325 may filter a portion of each of the plurality of second resources. The filter 325 may filter out portions of the second resource that correspond to user comments or other advertisements. In some implementations, the filtered portions of a resource may be deleted from memory 302. In some implementations, the location of the filtered potions of a resource may be stored in a data structure. The data structure may be used by the extractor 330.

Still referring to FIG. 3, memory 302 is shown to include an extractor 330. The extractor 330 may detect a plurality of second identifiers from the plurality of second resources. In some implementations, the extractor 330 may extract, determine, or identify the plurality of second identifiers from the plurality of second resources. The extractor 330 may not detect a second identifier in the filtered portions of a second resource. The extractor 330 may detect a second identifier from a hidden portion of a second resource. The extractor 330 may detect a second identifier that is of a same type or a different type of identifier as the first identifier. The extractor 330 may use a different set of rules to detect different types of identifiers. The set of rules may be implemented as a function, a class, a library, a module, an application programming interface (API), or other software, on a hardware, or a server. The extractor 330 may comprise a finder that finds a plurality of potential identifiers in a resource, a classifier that classifies each of the potential identifiers, and a selector that selects one of the potential identifier as a second identifier responsive to the classification. The selector may select one or more second identifiers that are classified as the same type of identifier as the first identifier. In some implementations, the extractor 330 may detect every type of identifier that is identifiable in the plurality of second resources. In some implementations, the extractor 330 detects a second identifier by searching or parsing through the text of a resource. In some implementations, the extractor 330 detect an identifier from a rendered resource. In some implementations, the extractor 330 uses portions of the URL or IP addresses to determine which set of rules to use to detect different types of identifiers.

Still referring to FIG. 3, memory 302 is shown to include a mapper 335. The mapper 335 creates a map of the plurality of second identifiers with the domain of the URL. In some implementations, the map may include a plurality of second identifiers that is mapped to a domain. In some implementations, the map may comprise a plurality of second identifiers that is mapped to a URL. In some implementations, the map may comprise multiple levels. For instance, a root domain is mapped to multiple subdomains, and each subdomain is mapped to multiple resources, and each resource is mapped to multiple second identifiers. In some implementations, the map can be loaded into memory after the domain determiner 315 determines the domain.

Still referring to FIG. 3, memory 302 is shown to include a comparator 340. The comparator 340 may use the map to compare the first identifier with each of the plurality of second identifiers. In some implementations, the comparator 340 compares the first identifier against each of the plurality of second identifiers. In some implementations, the comparator 340 compares the first identifiers against each of the plurality of second identifiers that are of the same type of identifier as the first identifier. In some implementations, a partial match may be accepted.

Still referring to FIG. 3, memory 302 is shown to include an authorizer 350. The authorizer 350 may approve the use of the first identifier with the content item. In some implementations, the authorizer 350 may comprise a linker that associates the first identifier with the received content item. In some implementations, the authorizer 350 embeds the first identifier in the received content item such that a user that is using a user device 108 may interact with the content item so as to contact the content provider.

In some implementations, if the authorizer 350 does not approve the first identifier to be used with the content item, an instructor may instruct the content provider to modify one of the plurality of second resources to include the first identifier. The instructor may communicate with the receiver 310 to send the instruction to the content provider. The resource loader 320 may load a modified resource, and the extractor 330 may detect a third identifier from the modified resource. The comparator 340 may compare the third identifier with the first identifier and the authorizer 350 may approve the use of the first identifier with the content item, responsive to the first identifier matching the third identifier.

Figure 4A:
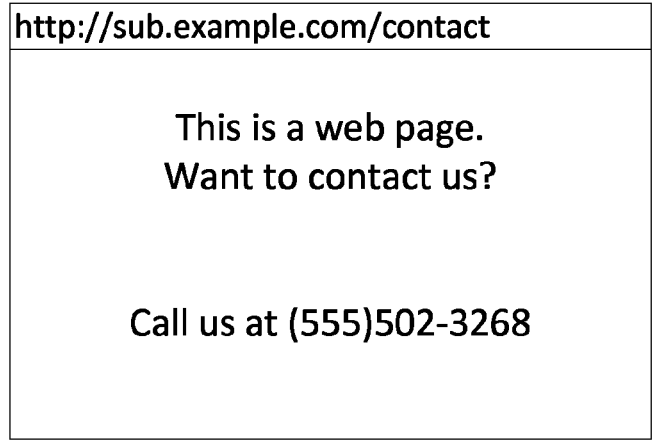
FIGS. 4A, 4B, and 4C are graphical representations of illustrative web pages under a domain.
Figure 4B:
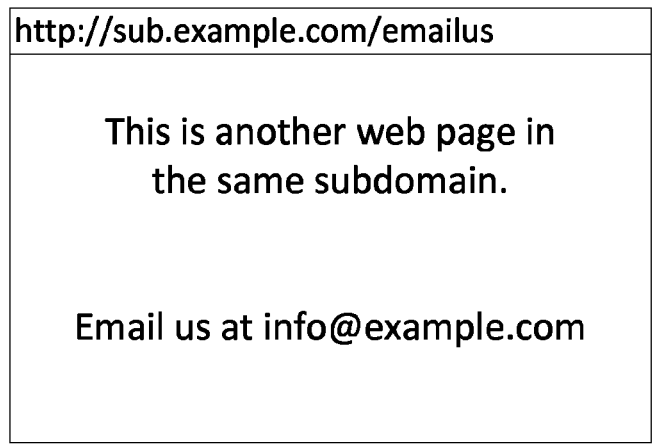
Figure 4C:
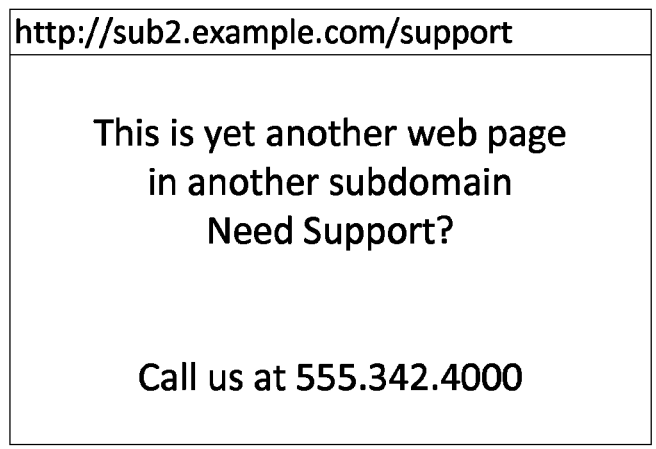

FIGS. 4A, 4B, and 4C are graphical representations of illustrative web pages. FIG. 4A is a web page with a URL of "sub.example.com/contact" that contains a phone number that is an identifier. A content provider may provide the content item management system 104 with this URL so that the web page of FIG. 4A may be a landing page of a content item. The content provider may also provide a content item for a text ad, the content item comprising "See our inventory!" The content provider may provide a first identifier of "(555) 342-4000" as a phone number. The systems and methods disclosed herein may determine a subdomain of the received URL as "sub.example.com". The root domain of "example.com" may be determined as well.

If the subdomain was determined, a plurality of second resources under the subdomain are loaded. FIG. 4B is a web page under the same subdomain with a URL of "sub.example.com/emailus". This web page contains an identifier of info@example.com that is an email. The web page of FIG. 4A and FIG. 4B will both be loaded because they are under the subdomain "sub.example.com".

If the domain was determined, a plurality of second resources under the domain are loaded. FIG. 4C is a web page under the same domain but different subdomain with a URL of "sub2.example.com/emailus". The web page of FIG. 4C will be loaded only in implementations that uses the root domain of the provided URL in FIG. 4A. The web pages of FIG. 4A and FIG. 4B will also be loaded because they are under the root domain as well.

Figure 5A:
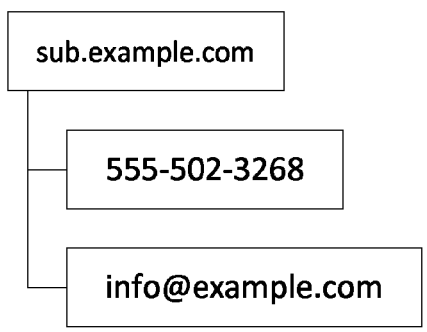
FIGS. 5A and 5B are block diagrams illustrating examples of map structures.
Figure 5B:
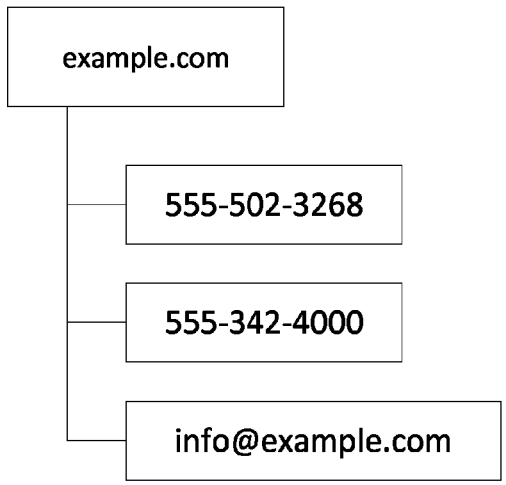

After a plurality of second resources are loaded, a plurality of second identifiers are extracted and a map of the domain and the plurality of second identifiers is created. FIG. 5A and FIG. 5B are block diagrams illustrating map structures. As illustrated in FIG. 5A, if the subdomain of "sub.example.com" was determined, two identifiers may be extracted from the webpages illustrated in FIG. 4A and FIG. 4B. In some implementations, identifiers of different types may be extracted and be part of the map. In other implementations, only the identifiers of the same type as the first identifier are extracted. For instance, the email "info@example.com" may not be included in the map structure. As illustrated in FIG. 5B, if the root domain of "example.com" was determined, three identifiers may be extracted from the web pages illustrated in FIGS. 4A, 4B, and 4C. Two phone numbers and an email address may be extracted from the web pages. A map is used to compare the received first identifier with each of the second identifier in the map that are of the same type. The content provider provided a first identifier of "(555) 342-4000" which matches one of the second identifiers in the map structure of FIG. 5B but not in the map structure of FIG. 5A. The first identifier may be approved for use with the content item if the root domain was used to construct the map, but not if the subdomain was used to construct the map.

Figure 6:
FIG. 6 is an illustrative content item displayed with a first identifier.

FIG. 6 is an illustrative advertisement displayed with a first identifier. If the first identifier was approved for use with the content item, then the content item may be associated with the first identifier. In some implementations, the content item may contain a link 680 to the provided URL or the first identifier 690 or an interface element 695. In some implementations, the interface element 695 may be a button. A user viewing the content item on a user device 108 may interact with the interface element 695 by, for instance, clicking on it, which causes the user device 108 to contact the content provider using the first identifier. One or more of the link 680, the first identifier 690 or the interface element 695 may be displayed with the content item. The interface element 695 may be configured and displayed based on the capabilities of the user device 108. For instance, the interface element 695 on a smartphone device may be configured such that when a user interacts with the interface element 695, the smartphone dials the content provider using the first identifier that is a phone number. On a desktop or a tablet device, the interface element 695 may be configured to launch a software on the user device 108 that can dial a phone number. The interface element 695 may not be displayed if the user device 108 lacks a functionality to contact or locate the content provider using the first identifier.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's user device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown, or sequential order, to achieve desirable results. In certain implementations, multitasking and parallel processing may be advantageous.

What is claimed is:

1. A computer-implemented method of verifying an identifier of a content provider, comprising:
   receiving, by a data processing system, a first identifier for contact information of a content provider, a content item, and a uniform resource locator (URL) from the content provider, the URL identifying a first resource;
   classifying, by the data processing system, the first identifier for contact information as a first type of identifier;
   determining, using the data processing system, a domain of the URL by parsing the URL for the first resource;
   accessing, by the data processing system, a plurality of second resources, each second resource under the domain, to store data associated with the plurality of second resources in memory;
   parsing, using the data processing system, the data associated with the plurality of second resources into one or more object trees;
   detecting, using the data processing system, a plurality of second identifiers from the one or more object trees;
   classifying, using the data processing system, each of the plurality of second identifiers based on a type of identifier for each of the plurality of second identifiers using data from the one or more object trees;
   mapping, using the data processing system, the plurality of second identifiers to the domain;
   filtering, using the data processing system, a set of second identifiers from the plurality of second identifiers based on comparing the type of identifier for each of the plurality of second identifiers to the first type of identifier of the first identifier for contact information to identify a filtered set of second identifiers;
   matching, using the data processing system and using the mapping, the first identifier with a second identifier of the filtered set of second identifiers to verify the first identifier;
   generating, using the data processing system, a link based on the first identifier with the content item responsive to the first identifier matching the second identifier;
   receiving, by a data processing system, a request for a content item from a computing device; and
   serving the received content item with the generated link to the computing device responsive to the request.

2. The method of claim 1, wherein accessing the plurality of second resources further comprises accessing and storing the first resource as one of the the plurality of second resources.

3. The method of claim 1, further comprising associating the first identifier with the content item.

4. The method of claim 1, further comprising:
   filtering a portion of each of the plurality of second resources; and
   wherein detecting the plurality of second identifiers comprises detecting the plurality of second identifiers from the filtered plurality of second resources.

5. The method of claim 1, wherein detecting the plurality of second identifiers further comprises detecting a second identifier from a hidden portion of a second resource.

6. The method of claim 1, further comprising:
   providing instructions to modify one of the plurality of second resources to include the first identifier;
   storing into memory a modified resource;
   detecting a third identifier from the modified resource; and approving use of the first identifier with the content item, responsive to the first identifier matching the third identifier.

7. The method of claim 1, wherein the first identifier comprises one of a phone number, a mailing address, email address, fax number, video chat handle, instant messaging handle, payment information, or a social media profile.

8. The method of claim 1, further comprising:
rendering each of the plurality of second resources using each object tree; and
wherein detecting the plurality of second identifiers comprises detecting the plurality of second identifiers from the rendered second resources.

9. The method of claim 1, wherein matching the first identifier comprises matching a portion of the first identifier with a portion of a second identifier of the plurality of second identifiers.

10. A system for verifying an identifier of a content provider, the system comprising:
one or more processors; and one or more storage devices storing instructions that, when executed by the one or more processors, cause the one or more processors to perform operations comprising:
receiving a first identifier for contact information of a content provider, a content item, and a uniform resource locator (URL) from a content provider, the URL identifying a first resource,
classifying the first identifier for contact information as a first type of identifier,
determining the domain of the URL by parsing the URL for the first resource,
loading, using the domain, a plurality of second resources, each second resource under the domain, to store data associated with the plurality of second resources into memory,
parsing the data associated with the plurality of second resources into one or more object trees,
detecting a plurality of second identifiers from the one or more object trees,
classifying each of the plurality of second identifiers based on a type of identifier for each of the plurality of second identifiers using data from the one or more object trees;
creating a map of the plurality of second identifiers with the domain,
filtering a set of second identifiers from the plurality of second identifiers based on comparing the type of identifier for each of the plurality of second identifiers to the first type of identifier of the first identifier for contact information to identify a filtered set of second identifiers,
matching, using the map, the first identifier with a second identifier of the filtered set of second identifiers to verify the first identifier;
generating a link based on the first identifier with the content item responsive to the first identifier matching the second identifier;
receiving a request for a content item from a computing device; and
serving the received content item with the generated link to the computing device responsive to the request.

11. The system of claim 10, wherein loading the plurality of second resources comprises storing the first resource as one of the plurality of second resources.

12. The system of claim 10, wherein the one or more storage devices store instructions that, when executed by the one or more processors, cause the one or more processors to perform operations further comprising:
associating the identifier with the content item.

13. The system of claim 10, wherein the one or more storage devices store instructions that, when executed by the one or more processors, cause the one or more processors to perform operations further comprising:
filtering a portion of each of the plurality of second resources; and
wherein detecting the plurality of second identifiers is from the filtered the plurality of second resources.

14. The system of claim 10, wherein detecting the plurality of second identifiers comprises detecting a second identifier from a hidden portion of a second resource.

15. The system of claim 10, wherein the one or more storage devices store instructions that, when executed by the one or more processors, cause the one or more processors to perform operations further comprising:
instructing the content provider to modify one of the plurality of second resources to include the first identifier;
storing the modified resource in memory;
detecting a third identifier from the modified resource; and
approving the content provider to use the first identifier with the content item responsive to the first identifier matching the third identifier.

16. The system of claim 10, wherein the first identifier comprises one of a phone number, a mailing address, email address, fax number, video chat handle, instant messaging handle, payment information, or a social media profile.

17. The system of claim 10, wherein the one or more storage devices store instructions that, when executed by the one or more processors, cause the one or more processors to perform operations further comprising:
rendering each of the plurality of second resources using each object tree; and
detecting the plurality of second identifiers from each of the rendered second resources.

18. The system of claim 10, wherein matching the first identifier comprises matching a portion of the first identifier with a portion of a second identifier of the plurality of second identifiers.

* * * * *